June 19, 1951 J. S. OLES 2,557,511
VIBRATION DAMPER
Filed Dec. 26, 1947
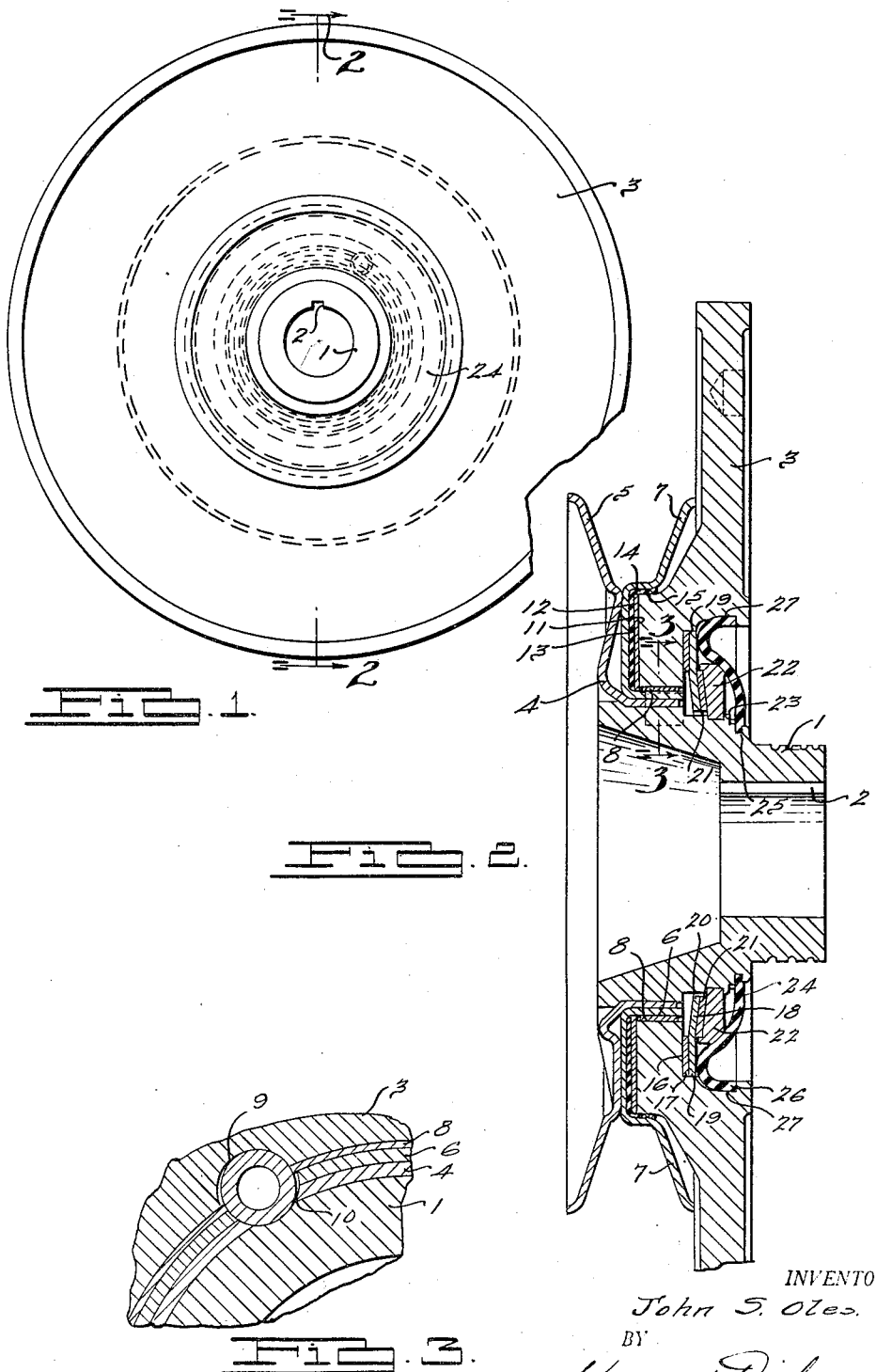
INVENTOR.
John S. Oles.
BY
Harness, Dickey & Pierce
ATTORNEYS.

Patented June 19, 1951

2,557,511

UNITED STATES PATENT OFFICE 2,557,511

VIBRATION DAMPER

John S. Oles, Detroit, Mich.

Application December 26, 1947, Serial No. 794,063

4 Claims. (Cl. 74—574)

This invention relates generally to vibration dampers. More particularly it relates to torsional vibration damper constructions of the general type used in internal-combustion engines, and even more specifically to that general type or class of internal-combustion engines used primarily in automotive vehicles.

It is a primary object of the present invention to provide a torsional vibration damper construction, which, generally speaking, is of the friction type, and which inherently has two or more stages of effective operation. The invention is primarily concerned with a two stage damper construction in which one stage is particularly effective in damping torsional vibrations in the low amplitudes and a second stage which becomes effective in damping vibrations in the higher amplitudes where said first stage would inherently be of little or no effect.

Still another object of the present invention is to provide a torsional vibration damper of the friction type wherein an inertia member is frictionally connected to the hub, or directly to the crank-shaft by means of a pair of frictionally engaging assemblies, and in which one of said frictionally engaging assemblies includes resilient means associated therewith whereby to absorb minor relative movements between said hub and inertia member.

Yet another object of the present invention is to provide a two stage vibration damper construction which is extremely simple and rugged in construction and arrangement of parts, and which at the same time is particularly effective throughout all reasonable ranges of engine performance which may be encountered during normal use.

Still further the present invention contemplates a frictional type of vibration damper construction in which particularly novel and effective means are provided for sealing the friction surfaces against the entry of dirt, moisture or other foreign matter.

The present invention further contemplates the provision of a vibration damper construction of the friction type in which there are not only two stages of vibration damping provided but in which the second stage of vibration damping does not become fully effective until such time as the torsional vibrations reach the point where the first stage is relatively ineffective, and conversely a vibration damper construction in which the first stage of vibration damping does not materially serve to interfere with the vibration damping action of the second stage, but rather serves to complement the same.

Yet another object of the present invention is to provide a vibration damper which is very simple in construction, easily and cheaply manufactured, and which at the same time is particularly effective in use throughout a wide range of engine operating conditions.

Many other objects, advantages and features of the present invention will become apparent from the following specification when considered in connection with the accompanying drawings forming a part thereof.

In the drawings:

Figure 1 is an axial elevational view of a vibration damper construction embodying the improvements of the present invention;

Figure 2 is a transverse sectional view taken along the line 2—2 of Figure 1, illustrating in detail the manner in which the inertia member of the improved vibration damper is interconnected to the hub thereof and showing in detail the various frictional vibration damping assemblies;

Figure 3 is an enlarged fragmentary sectional view taken along the line 3—3 of Figure 2 illustrating in detail the means provided for positively limiting relative displacement of the inertia member with respect to the hub member of the construction.

Referring now specifically to the drawings, it should be borne in mind that the extremely specific embodiment of the invention shown in the accompanying drawings and described below is merely one form which the invention may take and that there are numerous novel and important basic principles disclosed herein which are susceptible of use in substantially different vibration dampers which are not specifically disclosed herein but which are included in the generic definition of the invention as set forth in the appended claims.

Bearing the above in mind it will be understood that the specific description set forth below is necessarily directed specifically to the particular construction shown in the drawings and should not be construed as, in any sense, limiting the scope of the invention hereinafter claimed.

In the particular construction shown, the vibration damper comprises a hub member 1 which is concentrically symmetrical and of generally annular form. This hub member is adapted to be rigidly secured to a crankshaft (not shown) by means of a key (not shown) mounted in a keyway 2, seen in Figures 1 and 2. An inertia member of annular form generally designated 3 surrounds the hub member 1 and is mounted thereon in the manner hereinafter described in detail. This inertia member 3 is formed of cast iron or of any suitable equivalent construction and of course will be of a diameter and weight, shape and form suitable to the engine with which it is intended to be associated.

A suitable sheet metal stamping 4 which is flared outwardly to form a flange 5 constituting one side of a fan belt pulley is press-fitted over the outer cylindrical diameter of the hub member 1. A complemental annular sheet metal stamping 6 with a complementally outwardly flared portion 7 is press-fitted over the cylindrical hub portion of the stamping 4, and as far as the present invention is concerned these stampings may as well be considered as integral portions of the hub member 1.

Annularly surrounding the exterior cylindrical surface of the sheet metal member 6 and press-fitted thereover is a bearing ring 8 which serves to journal or rotatably mount the inertia member 3, for limited circumferential movement with respect to the hub member 1. As is most clearly seen in Figure 3 of the drawings, means are provided for limiting relative movement of the inertia member 3 with respect to the hub member 1. Various means will accomplish the same result; however, in the particular specific construction shown, a generally semi-circular recess 9 is provided in the interior bore of the inertia member 3 which is complemental to the corresponding recess 10 provided in the members 4, 6, 8 and 1. The generally cylindrical recess thus provided serves to receive a pin or tubular anchor member 11 which, as shown, is of sufficiently smaller diameter than the recess in which it is seated so that it will permit appreciable angular or circumferential movement of the inertia member 3 with respect to the hub member 1 but will definitely limit relative rotative movement of these members within predetermined limits.

The inertia member 3 may be of any suitable shape or form and is preferably provided with an axial annular friction surface 11 on one side thereof, against which bears an annular friction element 12 substantially co-extensive with the friction face 11. This friction element 12 is urged into engagement with the friction face 11 by means of an annular resilient member 13, preferably formed of rubber, and as shown in the drawings, this resilient member 13 is of greater diameter than the friction element 12 and friction face 11 and has an axially extending generally cylindrical portion 14 which overlies the peripheral surface of the hub portion of the inertia member 3 as is clearly seen in Figure 2 of the drawings.

The sheet metal stamping 7 described above has the radial inward portion thereof formed of a configuration which closely follows the configuration of the adjacent portion of the inertia member 3 in order to retain the resilient element 13 in tight engagement with its associated parts. The hub portion of the inertia member 3 is provided with a slightly elevated ridge therearound, this ridge being designated as 15, which serves to tightly clamp the outer portion of the resilient element 13 to positively anchor the same in position and at the same time serves to provide an effective means for sealing the frictional surface 11 and its engaged friction member 12 from the entry of moisture, dirt or other foreign matter.

On the opposite axial face of the hub of the inertia member 3 is provided a second frictional surface of generally annular configuration, this second frictional surface being designated 16. The frictional surface 16 has in engagement thereto an annular friction element 17 which is urged into engagement therewith by means of a spring washer 18 of annular form. The spring washer 18 has its radially outward portion 19 formed to provide an axial face lying in a plane substantially perpendicular to the axis of the vibration damper construction and substantially co-extensive with the friction element 17.

The radially inward portion 20 of the washer 18 is of slightly frusto-conical form and is engaged on its outward side by means of a frusto-conical washer element 21 which is anchored in position by means of a relatively heavy annular collar 22 anchored to the hub member 2. This annular collar 22 may be seated upon a suitable shoulder of the hub member and have portions of the hub member 23 stacked against its outward face to lock it in predetermined desired position.

The frictional assembly described above is sealed by means of an annular resilient seal 24 which has its radially inward marginal edge anchored in a suitable groove 25 surrounding the hub member 2, as is clearly seen in two of the drawings.

As is seen by reference to Figure 2 of the drawings, the entire frictional assembly just described is locked in an annular recess formed in the inertia member 3 and the outer edge 26 of the sealing member 24 is anchored in a suitable recess 27 in the inertia member 3.

The function of the device is substantially as follows:

When the hub portion 2 is keyed to the crankshaft of an internal-combustion engine it will be appreciated that the inertia member 3, because of its limited lost motion in connection with the crankshaft, will be effective in absorbing torsional vibrations. Since the inertia member has an annular face 16, which through various frictional surfaces directly engages the hub member, any relative movement between the hub member and the inertia member must result in relative slippage between these frictionally engaged surfaces. This slippage takes place in the first stage of vibration damping action. It is obvious that slippage will not take place in the second stage until the relative movement between the inertia member and the hub member is greater than can be absorbed by the resilient member 13.

This relative slippage between the friction face 16 and the friction element 17 will be of an extremely limited nature and will be of sufficiently small magnitude so that the relative movement between the inertia member and the hub member can readily be absorbed by the resilient rubber element 13 which serves to back up the friction element 12 and urge the same against the friction face 11. The resilient element 13 permits sufficient relative movement between the inertia member and the hub to provide for proper vibration damping action by the friction face 16 and friction element 17 without any relative movement taking place between friction element 12 and its associated friction face. This limited relative movement between the friction face 16 and its associated friction element 17 will serve to damp torsional vibrations throughout a reasonably wide range, but will be primarily effective in the lower amplitudes.

When the crankshaft becomes subject to torsional vibrations in higher amplitudes, relative slippage between the friction face 11 and the associated friction member 12 will take place and be particularly effective in absorbing or damping torsional vibrations throughout a range of amplitude where the damping action provided by the friction element 17 and associated friction face 16 will be of materially less effect.

From the foregoing it will be clearly apparent that the first stage of vibration damping action is designed and intended to function during and throughout a relatively low range of amplitudes and because of the construction described above is free to do so while the second stage is virtually inoperative. When the torsional vibrations reach an amplitude sufficient to bring the second stage into operation it will be clear that the first stage will become progressively less effective.

Many other and further modifications of the specific vibration damper described above falling within the general spirit and scope of the following claims will be apparent to those skilled in the art.

I claim:

1. A torsional vibration damper construction comprising a hub member adapted for attachment to the end of a crankshaft of an internal combustion engine, an inertia member mounted on said hub member for limited circumferential movement with respect thereto, said inertia member being provided with a pair of separate frictional faces, one on each of the opposite axial faces thereof, a friction element in engagement with each of said frictional faces, a pair of abutments carried by said hub member serving to clamp said frictional element and said inertia member therebetween, compression spring means interposed between one of said abutments and the adjacent frictional element and a body of resilient material likewise interposed between one of said abutments and the adjacent frictional element, said spring means serving to provide axial compression in said assembly and said resilient material serving to permit limited relative circumferential movement between one of said frictional elements and one of said abutments.

2. A torsional vibration damper construction comprising a hub member adapted for attachment to the end of a crankshaft of an internal combustion engine, an inertia member mounted on said hub member for limited circumferential movement with respect thereto, said inertia member being provided with a pair of separate frictional faces, one on each of the opposite axial faces thereof, a friction element in engagement with each of said frictional faces, a pair of abutments carried by said hub member serving to clamp said frictional elements and said inertia member therebetween, a spring washer resilient in an axial direction, but rigid, circumferentially interposed between one of said abutments and the adjacent frictional element and a body of resilient material interposed between the other of said abutments and its adjacent frictional element.

3. A torsional vibration damper construction comprising a hub member adapted for attachment to the end of a crankshaft of an internal combustion engine, an inertia member mounted on said hub member for limited circumferential movement with respect thereto, said inertia member being provided with a pair of separate frictional faces, one on each of the opposite axial faces thereof, a friction element in engagement with each of said frictional faces, a pair of abutments carried by said hub member serving to clamp said frictional elements and said inertia member therebetween, compression spring means interposed between one of said abutments and the adjacent frictional element and a body of resilient material interposed between the other of said abutments and its adjacent frictional element, one of said friction elements having a substantially greater resistance to displacement with respect to its associated friction face than the other.

4. A torsional vibration damper construction comprising a hub member adapted for attachment to the end of a crankshaft of an internal combustion engine, an inertia member mounted on said hub member for limited circumferential movement with respect thereto, said inertia member being provided with a pair of separate frictional faces, one on each of the opposite axial faces thereof, a friction element in engagement with each of said frictional faces, a pair of abutments carried by said hub member serving to clamp said frictional elements and said inertia member therebetween, a spring washer resilient in an axial direction, but rigid, circumferentially interposed between one of said abutments and the adjacent frictional element, a body of resilient material interposed between the other of said abutments and its adjacent frictional element, and resilient sealing means interconnecting said hub member and said inertia member whereby to protect said frictional elements and surfaces from foreign matter.

JOHN S. OLES.

REFERENCES CITED

The following references are of record in the file of this patent:

UNITED STATES PATENTS

| Number | Name | Date |
| --- | --- | --- |
| Re. 15,645 | Tibbetts | July 10, 1923 |
| 1,107,731 | Vold | Aug. 18, 1914 |
| 1,882,281 | Griswold | Oct. 11, 1932 |
| 2,062,369 | Meyer | Dec. 1, 1936 |
| 2,383,400 | McFarland | Aug. 21, 1945 |
| 2,386,402 | Lilja | Oct. 9, 1945 |
| 2,527,830 | Lilja | Oct. 31, 1950 |